US012576744B2

(12) United States Patent
Salter et al.

(10) Patent No.: US 12,576,744 B2
(45) Date of Patent: Mar. 17, 2026

(54) POWER ALLOCATION METHODS AND SYSTEMS FOR POWER TRANSMISSIONS BETWEEN A VEHICLE AND DEVICES

(71) Applicant: Ford Global Technologies, LLC, Dearborn, MI (US)

(72) Inventors: Stuart C. Salter, White Lake, MI (US); William Wurz, San Francisco, CA (US); Zeljko Deljevic, Plymouth, MI (US); Vyas Darshan Shenoy, Canton, MI (US); Ryan J. O'Gorman, Beverly Hills, MI (US); William David Treharne, Ypsilanti, MI (US); Seth Anthony Bryan, Royal Oak, MI (US); Angel Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 853 days.

(21) Appl. No.: 17/845,109

(22) Filed: Jun. 21, 2022

(65) Prior Publication Data

US 2023/0406139 A1     Dec. 21, 2023

(51) Int. Cl.
| | |
|---|---|
| *H02J 7/00* | (2026.01) |
| *B60L 1/00* | (2006.01) |
| *B60L 53/64* | (2019.01) |
| *B60L 58/13* | (2019.01) |
| *G06F 1/3203* | (2019.01) |
| *H02J 7/34* | (2006.01) |
| *H02J 105/37* | (2026.01) |
| *H02J 105/44* | (2026.01) |

(52) U.S. Cl.
CPC ............... B60L 53/64 (2019.02); B60L 1/006 (2013.01); B60L 58/13 (2019.02); G06F 1/3203 (2013.01); H02J 7/342 (2020.01); H02J 2105/37 (2026.01); H02J 2105/44 (2026.01)

(58) Field of Classification Search
None
See application file for complete search history.

(56) References Cited

U.S. PATENT DOCUMENTS

| | | | |
|---|---|---|---|
| 9,694,684 B2 | 7/2017 | Enomoto | |
| 9,862,286 B2 | 1/2018 | Mizuno | |
| 10,503,232 B2 | 12/2019 | Lota | |
| 2005/0284675 A1* | 12/2005 | Sanchen | B60L 50/61 180/65.245 |
| 2010/0188043 A1* | 7/2010 | Kelty | B60L 58/16 320/109 |
| 2013/0278208 A1 | 10/2013 | Rejman et al. | |
| 2015/0123598 A1* | 5/2015 | Tew | B60R 16/03 320/107 |
| 2015/0217656 A1* | 8/2015 | Loftus | B60L 55/00 320/136 |
| 2021/0291670 A1 | 9/2021 | Kaufman et al. | |

* cited by examiner

*Primary Examiner* — Arun C Williams
(74) *Attorney, Agent, or Firm* — David B. Kelley; Carlson, Gaksey & Olds, P.C.

(57) ABSTRACT

A power allocation method includes monitoring at least one first device that can be recharged by a vehicle, monitoring at least one second device that can be electrically powered by the vehicle, and adjusting a charging of the at least one first device based on an operation of the at least one second device.

20 Claims, 3 Drawing Sheets

POWER ALLOCATION METHODS AND SYSTEMS FOR POWER TRANSMISSIONS BETWEEN A VEHICLE AND DEVICES

TECHNICAL FIELD

This disclosure relates generally to allocating power when a vehicle is providing power to various devices that are external to the vehicle.

BACKGROUND

Some vehicles can be used to power devices external to the vehicle. Some of these vehicles can essentially operating as a generator to provide exportable power. Some of these vehicles can instead, or additionally, power the devices with power that is received from a charger, a traction battery, or both.

SUMMARY

In some aspects, the techniques described herein relate to a power allocation method, including: monitoring at least one first device that can be recharged by a vehicle; monitoring at least one second device that can be electrically powered by the vehicle; and adjusting a charging of the at least one first device based on an operation of the at least one second device.

In some aspects, the techniques described herein relate to a method, wherein adjusting the charging of the at least one first device based on a starting of the at least one second device.

In some aspects, the techniques described herein relate to a method, wherein adjusting the charging includes reducing an amount of power provided to the at least one first device.

In some aspects, the techniques described herein relate to a method, wherein adjusting the charging includes stopping a charging of the at least one first device prior to a starting of the at least one second device.

In some aspects, the techniques described herein relate to a method, wherein stopping the charging includes shutting off an individual electrical outlet, the at least one first device electrically coupled to the vehicle via the individual electrical outlet.

In some aspects, the techniques described herein relate to a method, wherein the at least one second device is a pump.

In some aspects, the techniques described herein relate to a method, wherein the at least one second device is a compressor.

In some aspects, the techniques described herein relate to a method, further including adjusting the charging of the at least one first device based on a state of charge of the at least one first device.

In some aspects, the techniques described herein relate to a method, further including providing electrical power to the at least one second device through one or more individual electrical outlets of the vehicle, the vehicle configured to transition the individual electrical outlets between a powered state where the electrical outlet can be used to power the at least one second device and an unpowered state where the electrical outlet cannot provide power to the at least one second device.

In some aspects, the techniques described herein relate to a method, further including transitioning the at least one second device from the unpowered state to the powered state after adjusting the charging.

In some aspects, the techniques described herein relate to a method, further including adjusting the charging by charging the at least one device using power that is provided to the vehicle from a charger rather than power from a traction battery of the vehicle.

In some aspects, the techniques described herein relate to a method, further including requesting an additional power source in response to a projected usage being greater than what the vehicle can provide.

In some aspects, the techniques described herein relate to a method, including: charging at least one first device from a vehicle; receiving a request for the vehicle to power at least one second device from the vehicle; and adjusting the charging in response to the request.

In some aspects, the techniques described herein relate to a method, wherein adjusting the charging include stopping the charging.

In some aspects, the techniques described herein relate to a method, wherein adjusting the charging includes stopping the charging until the at least one second device has started, and then restarting the charging while the at least one second device is running.

In some aspects, the techniques described herein relate to a method, wherein the at least one second device is a compressor that is driven by a power take off of the vehicle.

In some aspects, the techniques described herein relate to a method, wherein the at least one second device is a pump.

In some aspects, the techniques described herein relate to a method, wherein the at least one second device is a winch.

In some aspects, the techniques described herein relate to a system for a vehicle, including: an electrified vehicle having a traction battery; at least one first device configured to be charged by the vehicle; at least one second device configured to operate while being electrically powered by the vehicle; and a control module configured to adjust a charging of the at least one first device in response to a need to operate the at least one second device.

In some aspects, the techniques described herein relate to a system, wherein the at least one second device includes an electrically powered motor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
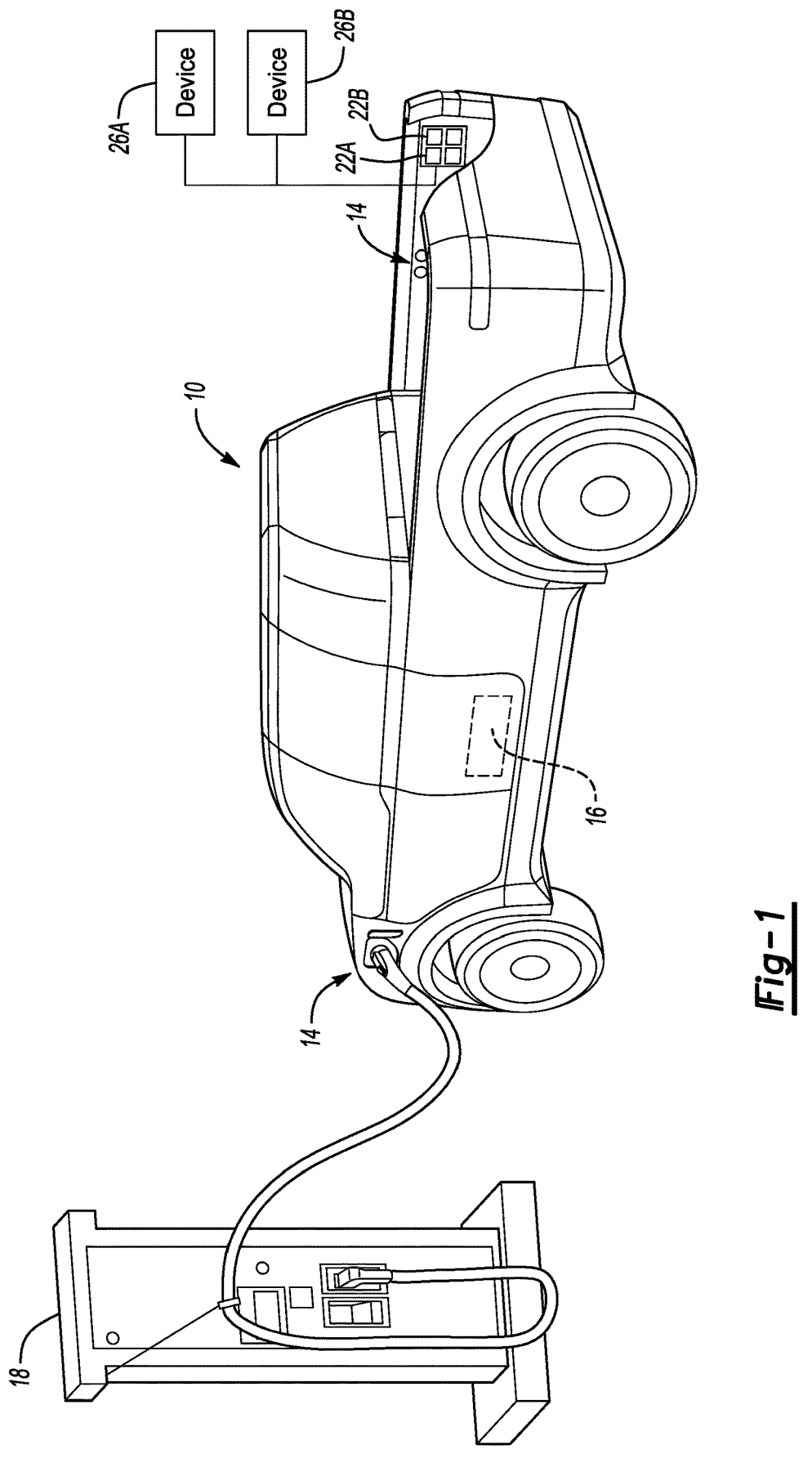
FIG. 1 illustrates a perspective and partially schematic view of a vehicle powering a plurality of devices according to an exemplary aspect of the present disclosure.

A vehicle, such as a hybrid vehicle or an electric vehicle, can be used to power a plurality of devices during operation of the devices. Power from the vehicle can be used to recharge various devices, such as rechargeable tools. For example, a vehicle at a construction site can power devices, such as a compressor, a skid loader, a sky lift, worksite lights, etc. That same vehicle can provide power to recharge tools, such as drills or saws. This disclosure relates to controlling how the vehicle allocates power.

For supplying power to the plurality of devices, the vehicle can utilize the power stored in a battery of the vehicle, power that is received from an external source through a charge port of the vehicle, or both.

The vehicle can include a plurality of electrical outlets that allow devices to electrically couple to the vehicle. Devices can draw, for example, 120V, 230V, or DC through the electrical outlets. When a device is connected to an electrical outlet of the vehicle, the power stored in the battery of the vehicle and/or the power received from the external source may be supplied to the connected device.

This disclosure describes, among other things, a method for scheduling power transmission and allocating power for transmission from a vehicle to a plurality of devices. The plurality of devices may be coupled to the vehicle mechanically or electrically, through a plurality of outlets of the vehicle.

When a charge port of the vehicle is connected to an external device, a maximum power that can be received by the vehicle is determined. Further, a projected power usage can be determined based on historical power usage and a plurality of devices that are electrically coupled to the vehicle. The projected power usage includes a predicted power usage by the vehicle for internal operations and a predicted power usage for transmission to the plurality of devices.

Power transmission from the vehicle to each device can be scheduled based on, for example, the state of charge (SOC) of the device, the predicted power usage of the device, or both. A startup time of a number of devices of the plurality of devices can be staggered when a power level drawn at a particular time by the plurality of devices reaches a maximum of a power that can be supplied by the charger and a battery of the vehicle. The maximum may be established to maintain a certain state of charge for the battery so that the battery can be used to propel the vehicle at a future time.

Further, in response to determining that the projected power usage is greater than the power that can be supplied by the charger and the battery, an additional power source (such as a second vehicle) is called to supply a remaining power of the projected power usage. An example method of the present subject matter may be performed by a processor included in the vehicle, or a processor of a server connected to the vehicle through a wired or wireless network.

These and other features of this disclosure are discussed in greater detail in the following paragraphs of this detailed description.

With reference to FIG. 1, an electrified vehicle 10 can include a plurality of charge ports 14 and a traction battery 16. The vehicle 10 can electrically couple to charger 18 through one or more of the charge ports 14. The EVSE 18 can be used to recharge the traction battery 16. The EVSE 18 can be connected to an external power source.

The vehicle 10 further include a plurality of electrical outlets 22. The vehicle 10, in some examples, is configured to shut-off and turn on (via, for example, relays, solid state switches, or disabling of power electronics) each outlet individually or in groups. In this example, at least one first device 26A and at least one second device 26B can be powered by the vehicle 10 through the electrical outlets 22. The first device 26 and the second device 26B can be selectively powered from the vehicle 10 using power from the traction battery 16, power from the charger 18, or both. The first device 26A and the second device 26B are external to the vehicle 10. In some examples, the charge ports 14 can be bidirectional and can, optionally, be used as electrical outlets.

In this example, the first device 26A is a rechargeable device having a battery that can be recharged using power from the vehicle 10. The first device 26A could be a drill, for example.

In this example, the second device 26B is a device that can be electrically powered by the vehicle 10 as the device is operated. The second device 26B can be a device having a motor, such as a lift. As can be appreciated, devices having motors can require a relatively high amount of power during start-up of the motor. The required power is reduced when the motor is running. The power required to start can be referred to as starting Watts and the power required after starting can be referred to as running Watts.

The vehicle 10 can communicate with the first device 26A and the second device 26B via a wired connection, wireless connection, or both. Communications to the vehicle 10 from the first device 26A and the second device 26B can provide identifying information to the vehicle 10 (e. g., device name, device type). Communications to the vehicle 10 can provide state of charge information to the vehicle 10.

Figure 2:
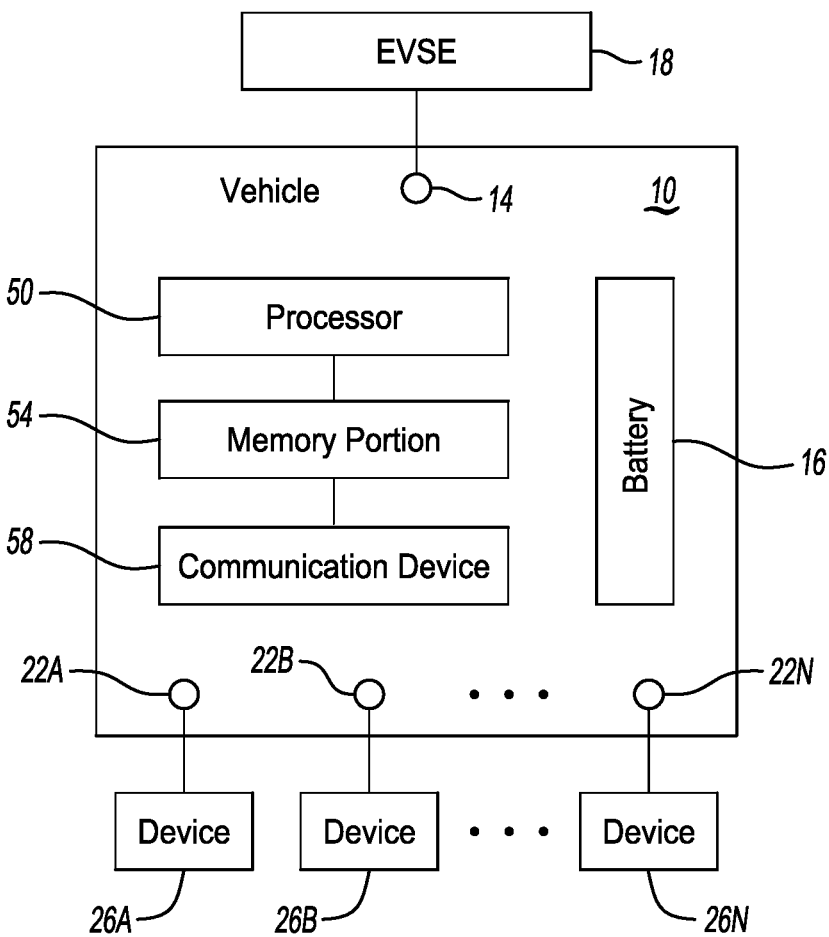
FIG. 2 illustrates a highly schematic view of the vehicle of FIG. 1 used as a power station.

FIG. 2 illustrates a highly schematic view of the vehicle 10 used as a power station. In another implementation, the power station may be a combination of a server and a vehicle, which can communicate to each other over a network.

The vehicle 10 includes at least one charge port 14 to receive power from at least one EVSE 18 or other external power source. The capacity of the EVSE 18 can vary from 8 kW AC to 350 kW DC with a typical capacity at 20 kW to 25 kW of AC or DC. AC could be from 1.2 kW to 19 kW, and a DC fast charger from 25 kW and up to 350 kW. The EVSE 18 can supply DC to the vehicle 10. In another example, the EVSE 18 supplies AC. The power received from the at least one EVSE 18 may be used for charging a battery of the vehicle 10, such as the battery 16 of the vehicle 10.

The vehicle 10 also includes the electrical outlets 22A to 22N, which, in this example, can be individually turned off and on. The plurality of devices 26A to 26N can electrically couple to the vehicle 10 through the plurality of outlets 22A to 22N. When one of the devices 26A to 26N is connected to a respective one of the electrical outlets 22A to 22N of the vehicle 10, the power stored in the battery 16 and/or the power received from the charger 18 can be supplied to the device 26A to 26N. In this example, the charge ports 14 can also be used to send power to devices that can receive HV DC energy.

Both AC and DC power received from the EVSE 18 may have opportunity for the passthrough power transmission. AC power coming into the vehicle 10 can be converted to DC, and then back to AC for the devices 26A to 26N. When sent out through port 14, is the power can be DC at high voltage. DC coming in from EVSE 18 can converted to AC for the devices 26A to 26N, or can be DC output at one of the charge ports 14. Both AC and DC power received from the EVSE 18 may also be supplied through the battery 16 of the vehicle 10.

The plurality of outlets 22A to 22N may include charge ports for DC charging, a pro-power onboard (PPO) for AC charging, a mechanical power take-off (PTO) from shaft of electric motor, power tool charger stations in the frunk, an in-cabin 12V power tool charger, etc.

The plurality of devices 26A to 26N can include recharge-able tools, pumps, winches. a skid loader, a sky lift, air compressors, smaller tools and robots, worksite lights, a large pop-up touch screen in the frunk for a worksite conference, a construction site office inside the power station 102, etc. The compressor could be driven by the PTO.

In an example, the skid loader and the sky lift may receive power through the charge ports for DC charging. Further-more, the worksite lights and smaller tools and robots may receive power through the PPO.

In addition to the charge port 14 and the plurality of outlets 22A to 22N, the vehicle 10 can include control module having a processor 50, a memory portion 54, and a communication device 58. The processor 50 can perform various operations of the present subject matter for sched-uling power transmission and allocating power for transmis-sion from the vehicle 10 to the plurality of devices 26A to 26N. The memory portion 54 can be coupled to the proces-sor 50 and may store the operations for execution by the processor 204. The processor 204 may be a general purpose processor or a special purpose processor.

The communication device 58 of the vehicle 10 may be used to communicate with the plurality of devices 26A to 26N and/or a server. The communication device 58 could be, for example, a WiFi transceiver, an infrared transceiver, a Bluetooth transceiver, a wireless cellular telephony trans-ceiver, and/or the like. The battery 16 may be a rechargeable battery for storing energy. The energy stored in the battery 16 may be used for various internal operations such as driving an electric motor of the vehicle 10. The energy stored in the battery 16 may also be used for supplying power to the plurality of devices 26A to 26N. It will be appreciated that additional components, not shown in FIG. 2, may also be a part of the vehicle 10 in certain embodi-ments, and in certain embodiments fewer components than shown in FIG. 2 may be used. In addition, it will be appreciated that one or more communication buses, not shown in FIG. 2, may be used to interconnect the various components as is well known in the art.

In an example, the vehicle 10 can, via the communication device 58, communicate with a server, which can include a processor, a memory portion, and a communication device. The processor may perform various operations of the present subject matter for scheduling power transmission and allo-cating power for transmission from the vehicle 10 to the plurality of devices 26A to 26N. The memory portion of the server can be coupled to the processor of the server and may store the operations for execution by the processor of the server.

Communications between the server and the vehicle 10 can be WiFi, infrared, Bluetooth, wireless cellular telephony, and/or the like.

Figures 3, 4:
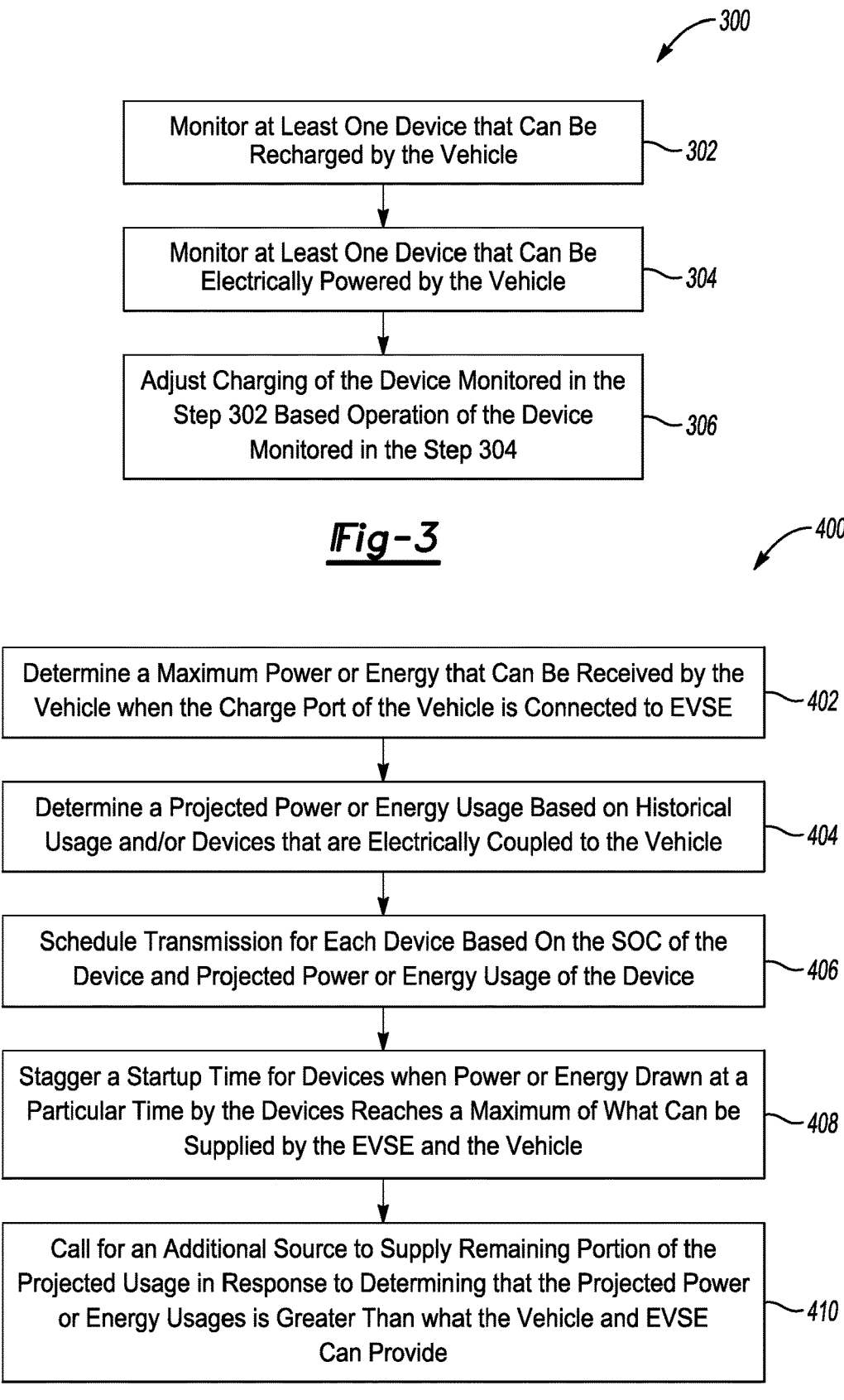
FIG. 3 illustrates a flow of a method of allocating power from the vehicle of FIG. 1 according to an exemplary aspect of the present disclosure.
FIG. 4 illustrates a flow of a method of allocating power from the vehicle of FIG. 1 according to another exemplary aspect of the present disclosure.

FIG. 3 illustrates a power allocation method 300 which can be implemented by the processor 50 of the vehicle 10 or the processor of the server. The method 300, at block 302, monitors at least the first devices 26A within plurality of devices 26A to 26N. The first device 26A monitored at the block 302 is a device that can be recharged by the vehicle 10.

At a block 304, the method 300 monitors at least the second device within plurality of devices 26A to 26N. The second device 26B monitored at the block 304 is a device that can be electrically powered by the vehicle 10.

The monitoring at the block 304 can include receiving a request for the vehicle 10 to power second device 26B from the vehicle 10. The request could be a user turning on a switch of the second device 26B, for example.

At a block 306, the method 300 adjust how the vehicle 10 charges the first device 26A monitored in the block 302. The adjusting is based on operation of the second device 26B, which is monitored in the block 304. The adjusting of the charging can be based on the device 26B starting or needing to start.

The second device 26B electrically powered by the vehicle 10 can be a device that includes a motor. The second device 26B electrically powered by the vehicle 10 can have a starting current requirement that is higher than a running current requirement. Adjusting the charging at the block 306 can include reducing an amount of power provided the first device 26A, or even stopping the charging of first device 26A, prior to the starting the second device 26B. This can help to ensure that adequate power is supplied to the second device 26B electrically powered by the vehicle. The second device 26B can be a compressor, a pump, or a winch, for example.

After the second device 26B has been started and is drawing a running current rather than a starting current, the power provided to the first device 26A can be increased to restart or increase the charging.

In some examples, the method 300 can include adjusting the charging of the first device 26A based on a state of charge of the first device 26A. For example, the method 300 may stop the charging in the block 306 when a state of charge is at or above say 80 percent, but not when the state of charge is less than 80.

Adjusting the charging of the first device 26A could also include adjusting an amount of power provided by the charger 18 to the vehicle 10 for powering the first device 26A, and/or adjusting an amount of power provided by the battery 16 for powering the first device 26A. The adjusting can include, for example, charging the first device 26A using power that is provided to the vehicle 10 from the charger 18 rather than power from a traction battery of the vehicle.

After the adjusting in the block 306, the method 300 can transition the second device 26B from the unpowered state to the powered state. Transitioning the second device 26B to the powered state can include providing power through one of the electrical outlets 22A to 22N. The vehicle 10 can be configured to transition the individual electrical outlets 22A to 22N between a powered state where the electrical outlet 22A to 22N can be used to power the second device 26B and an unpowered state where the electrical outlet 22A to 22N cannot provide power to the second device 26B.

FIG. 4 illustrates a method 400 which can be implemented by the processor 50 of the vehicle 10 or the processor of the server. The method 400, at block 402, determines a maxi-mum power (or energy) that can be received by the vehicle 10, when the charge port 14 of the vehicle is connected to the EVSE 18. When the vehicle 10 is receiving power from the EVSE 18 through the charge port 14, the vehicle 10 would know the maximum power that can be received from the EVSE 18 since the vehicle 10 is in communication with the EVSE 18.

The method, at block 404, determines a projected power (or energy) usage based on historical power usage and/or current devices of the plurality of devices 26A to 26N coupled to the vehicle 10 for power transmission. The projected power usage may include a predicted power usage by the vehicle 10 for the internal operations and a predicted power usage for transmission to the plurality of devices 26A to 26N. The vehicle 10 may be in a Bluetooth low energy (BLE) communication with the plurality of devices 26A to 26N. If the vehicle 10 is supplying power to current devices of the plurality of devices 26A to 26N coupled to the vehicle 10, the vehicle 10 will know which device 26A to 26N is connected to which electrical outlet 22A to 22N since the vehicle 10 is in BLE communication with the plurality of devices 26A to 26N. If for some unlikely reason the vehicle 10 does not know which device 26A to 26N is connected to which electrical outlet 22A to 22N, then the vehicle 10 may turn off each outlet 22A to 22N one after another and check via BLE with the plurality of devices 26A to 26N to find out power transmission for which of the plurality of devices 26A to 26N is turned OFF. In this way, the vehicle 10 may map or verify the amount of power being received by the plurality of devices 26A to 26N from the vehicle 10.

In one embodiment, a human operator may specify the daily energy consumption pattern for the vehicle 10. For example, the operator may specify that the vehicle 10 stays at a worksite all day and is driven home or back to the main office overnight where the vehicle 10 may or may not be charged. If the operator specifies that the vehicle 10 will be charged at the home or the main office, then the operator may also specify the expected amount of time for which the vehicle 10 will be charged and the power rating of a charger at the home or the main office. In another example, the operator may specify that the vehicle 10 remains on the worksite 24 hours per day. This may be an expected pattern in large construction operations since hooking or unhooking all the plurality of devices 26A to 26N may be time consuming. Further, hooking and unhooking the plurality of devices 26A to 26N may cause issue since the vehicle 10 is essentially a large power strip and charging of the plurality of devices 26A to 26N will be interrupted. In another example, the operator may specify that the vehicle 10 is driven off-site during the day for lunch, to get materials, etc. The time for which the vehicle 10 is driven off-site during the day for lunch, to get materials, etc., may also be determined based on the recent historical usage of the vehicle 10. The daily energy consumption pattern for the vehicle 10 specified by the operator and determined based the recent historical usage of the vehicle 10 may be taken into consideration while determining the projected power usage.

Further, while determining the projected power usage, the typical power usage and the SOC of the plurality of devices 26A to 26N may also be considered if the plurality of devices 26A to 26N have been previously BLE linked or charged by the vehicle 10 and if the plurality of devices 26A to 26N are detected within the BLE range. The BLE range may be from 90 to 300 ft.

Furthermore, while determining the projected power usage, the vehicle 10 may also consider the daily task lists for the worksite. Further, the vehicle 10 may also consider the information about the devices 26A to 26N, such as how much electrical energy the devices 26A to 26N could require to accomplish the tasks. Information about how much the major devices 26A to 26N should be used to accomplish the daily task may be stored in the memory portion 54 of the vehicle 10 and/or the memory portion of the server.

The method, at block 406, schedules transmission for at least the first device 26A based on the SOC of the first device 26A and the predicted power (or energy) usage of the first device 26A.

In an example embodiment, in order to schedule transmission for each device 26A to 26N, a power usage percentage with respect to the maximum power that can be received from the charger 18 and the battery 16 is predicted, considering that all the plurality of devices 26A to 26N are active at once at full capacity. If the power usage percentage is greater than 100, then this means that the maximum power that can be received by the plurality of devices 26A to 26N at a particular time is more than the maximum power that can be received from the charger 18 and the battery 16. Therefore, if the power usage percentage is greater than 100, then vehicle 10 and/or the server prioritizes and schedules power transmission for each device 26A to 26N.

Further, in an example embodiment, in order to schedule power transmission for each device 26A to 26N, the power usage by the vehicle 10 for internal operations, such as going home by the vehicle 10, etc., the distance from the worksite to home, and the size of the EVSE at home may also be considered. For example, the vehicle 10 and/or the server may schedule or prioritize power transmission for each device 26A to 26N in a way such that enough power is available in the battery 16 of the vehicle 10 at the end of the day so that the vehicle 10 may be driven home from the worksite. Further, the vehicle 10 and/or the server may schedule or prioritize power transmission for each device in a way such that enough power is available in the battery 16 of the vehicle 10 at the end of the day so that the vehicle 10 may be driven back to the worksite from the home on the next day after charging through the charger at home.

Furthermore, in an example embodiment, in order to schedule transmission for each device 26A to 26N, it is predicted whether or not the current SOC of each device 26A to 26N is sufficient for the current workday based on the task list. If the current SOC of a device 26A to 26N is not sufficient for the current workday, transmission for the device 26A to 26N is scheduled according to the typical usage of the device 26A to 26N. The typical usage of the device 26A to 26N may be determined based on the recent historical data and/or the task list for the current day.

In an example embodiment, the construction site office inside the vehicle 10 may be given high priority for power transmission. The construction site office may operate on a 12V system. Further, during the start of the day of the worksite, charging of the battery 16 of the vehicle 10 through the charger 18 may be given high priority. For charging the battery 16, during the start of the day, the vehicle 10 and/or server may reduce the power rating for power transmission through the electrical outlets 22A to 22N to the plurality of devices 26A to 26N. In an example, for charging the battery 16, at least one electrical outlet 22A to 22N of the vehicle 10 may be turned off.

In an example embodiment, the vehicle 10 may prioritize passthrough charging instead of charging through the battery 16. For example, the devices 26A to 26N connected to the PPO may be powered directly off of the EVSE 18.

In an example embodiment, the priority of at least one electrical outlet 22A to 22N may be set by the human operator. The priority of at least one electrical outlet 22A to 22N may be set as interruptible or non-interruptible. In an example, the total amount of power that can be transmitted through the electrical outlet 22A to 22N having non-interruptible priority may be limited. The priority of at least one electrical outlet 22A to 22N may be changed as necessary depending on the real time worksite situation.

The method, at block 408, staggers a startup time of for the devices 26A to 26N when a power or energy drawn at a particular time by the devices 26A to 26N reaches a maximum of a power that can be supplied by the charger 18 and the battery 16 of the vehicle 10. The startup times for the devices 26A to 26N may be staggered based on the priority for power transmission.

The method, at block 410, calls for an additional source to supply remaining portion of the projected usage in response to determining that the projected power or energy usage is greater than what the battery 16 and EVSE 18 can provide. The additional source may be an additional vehicle or a charge trailer. The point of this is to check whether the maximum power that can be supplied by the charger 18 and the battery 16 would be able to supply enough energy for peak demands or not. In case the peak demands cannot be met by the maximum power that can be supplied by the charger 18 and the battery 16, then the additional source may be called via wireless communication or a cloud source from another site to meet peak demands.

In an example embodiment, an anticipated energy flow for the next day may also be determined. If the anticipated energy flow for the next day exceeds the what can be supplied by the EVSE 18 and the battery 16, then before the trip home, the vehicle 10 may draw energy back in to battery 16 to be used the next day.

The method 400 illustrates one implementation of scheduling the power transmission and allocating power for transmission from the vehicle 10 to the plurality of devices outlet 22A to 22N. In alternate embodiments, the order in which the blocks of method 400 are performed can be modified.

MON The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method, comprising:
 monitoring at least one first device that can be recharged by a vehicle, the at least one first device external to the vehicle and electrically coupled to the vehicle through a first electrical outlet of the vehicle;
 monitoring at least one second device that can be electrically powered by the vehicle, the at least one second device external to the vehicle and electrically coupled to the vehicle through a second electrical outlet of the vehicle that is different than the first outlet; and
 adjusting a charging of the at least one first device based on an operation of the at least one second device.

2. The method of claim 1, wherein adjusting the charging of the at least one first device based on a starting of the at least one second device.

3. The method of claim 2, wherein adjusting the charging includes reducing an amount of power provided to the at least one first device.

4. The method of claim 2, wherein adjusting the charging includes stopping a charging of the at least one first device prior to a starting of the at least one second device.

5. The method of claim 4, wherein stopping the charging includes shutting off the first electrical outlet, the at least one first device electrically coupled to the vehicle via the first electrical outlet.

6. The method of claim 1, wherein the at least one second device is a pump.

7. The method of claim 1, wherein the at least one second device is a compressor.

8. The method of claim 1, further comprising adjusting the charging of the at least one first device based on a state of charge of the at least one first device.

9. The method of claim 1, further comprising providing electrical power to the at least one second device through the second electrical outlet, the vehicle configured to transition the second electrical outlet between a powered state where the second electrical outlet can be used to power the at least one second device and an unpowered state where the second electrical outlet cannot provide power to the at least one second device.

10. The method of claim 9, further comprising transitioning the at least one second device from the unpowered state to the powered state after adjusting the charging.

11. The method of claim 1, further comprising adjusting the charging by charging the at least one device using power that is provided to the vehicle from an external source rather than power from a traction battery of the vehicle.

12. The method of claim 1, further comprising requesting an additional power source in response to a projected usage being greater than what the vehicle can provide.

13. A method, comprising:
 charging at least one first device from a vehicle when the at least one first device is electrically coupled to the vehicle through at least one first electrical outlet of the vehicle, the at least one first device external to the vehicle;
 receiving a request for the vehicle to power at least one second device from the vehicle when the at least one second device is electrically coupled to the vehicle through at least one second electrical outlet of the vehicle, the at least one second electrical outlet different than the at least one first electrical outlet, the at least one second device external to the vehicle; and
 adjusting the charging in response to the request.

14. The method of claim 13, wherein adjusting the charging includes stopping the charging.

15. The method of claim 13, wherein adjusting the charging includes stopping the charging until the at least one second device has started, and then restarting the charging while the at least one second device is running.

16. The method of claim 13, wherein the at least one second device is a compressor that is driven by a power take off of the vehicle.

17. The method of claim 13, wherein the at least one second device is a pump.

18. The method of claim 13, wherein the at least one second device is a winch.

19. A system for a vehicle, comprising:
 an electrified vehicle having a traction battery;
 at least one first device that is external to the electrified vehicle and is configured to be charged by the vehicle through at least one first electrical outlet of the vehicle;
 at least one second device that is external to the electrified vehicle and is configured to operate while being electrically powered by the vehicle through at least one second electrical outlet of the vehicle that is different that the first electrical outlet; and
 a control module configured to adjust a charging of the at least one first device in response to a need to operate the at least one second device.

20. The system of claim 19, wherein the at least one second device comprises an electrically powered motor.

* * * * *